(12) United States Patent
Choi

(10) Patent No.: US 12,395,970 B2
(45) Date of Patent: Aug. 19, 2025

(54) ELECTRONIC DEVICE AND METHOD OF IMMEDIATELY TRANSMITTING REAL-TIME APPLICATION TRAFFIC

(71) Applicant: SAMSUNG ELECTRONICS CO., LTD., Suwon-si (KR)

(72) Inventor: Junsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 494 days.

(21) Appl. No.: 17/804,047

(22) Filed: May 25, 2022

(65) Prior Publication Data

US 2023/0028345 A1 Jan. 26, 2023

Related U.S. Application Data

(63) Continuation of application No. PCT/KR2021/014789, filed on Oct. 21, 2021.

(30) Foreign Application Priority Data

Jul. 21, 2021 (KR) ........................ 10-2021-0095608

(51) Int. Cl.
*H04W 72/0446* (2023.01)
*H04L 65/10* (2022.01)
*H04L 69/22* (2022.01)

(52) U.S. Cl.
CPC ..... *H04W 72/0446* (2013.01); *H04L 65/1013* (2013.01); *H04L 69/22* (2013.01)

(58) Field of Classification Search
CPC . H04W 72/0446; H04W 12/06; H04W 28/02; H04W 28/0205; H04W 28/06;
(Continued)

(56) References Cited

U.S. PATENT DOCUMENTS 10,536,979 B2 1/2020 Ko et al.
10,594,525 B2 3/2020 Liu et al.
(Continued)

FOREIGN PATENT DOCUMENTS

KR 10-2018-0068963 A 6/2018
WO WO-2019049576 A1 * 3/2019

OTHER PUBLICATIONS

Oren kedem et al. "UORA Enhancements to address RTA", IEEE 802.11-20-1902/r0, submission to IEEE 802.11be, Nov. 29, 2020, Slide 2-13.
(Continued)

*Primary Examiner* — Ian N Moore
*Assistant Examiner* — Latresa A McCallum
(74) *Attorney, Agent, or Firm* — BROADVIEW IP LAW, PC

(57) ABSTRACT

An electronic device includes at least one wireless communication module at least one processor connected to the wireless communication module, and a memory connected to the processor and configured to store instructions executable by the processor. The processor is configured to, during transmission of a first data frame including first data through a first resource unit (RU) on a first time resource, in response to detecting second data being enqueued in a transmission queue, transmit a second data frame including the second data through a second RU on a second time resource overlapping the first time resource during the transmission of the first data frame, using the wireless communication module. The first data frame and the second data frame may be included in a physical layer protocol data unit, and a start time of the second time resource may be different from a start time of the first time resource.

20 Claims, 9 Drawing Sheets

(58) Field of Classification Search
CPC ... H04W 28/10; H04W 28/26; H04W 72/512; H04W 74/08; H04W 74/0866; H04W 84/12; H04L 65/1013; H04L 69/22; H04L 47/2416; H04L 69/321; H04L 69/323; H04L 69/324; H04L 67/125
See application file for complete search history.

(56) References Cited

U.S. PATENT DOCUMENTS

| | | | |
|---|---|---|---|
| 2017/0006608 A1* | 1/2017 | Josiam | H04L 5/001 |
| 2017/0273112 A1 | 9/2017 | Lou et al. | |
| 2018/0077641 A1* | 3/2018 | Yang | H04W 52/0229 |
| 2018/0302922 A1 | 10/2018 | Patil et al. | |
| 2019/0116527 A1* | 4/2019 | Ke | H04W 36/38 |
| 2019/0199565 A1* | 6/2019 | Kwon | H04W 72/23 |
| 2019/0313419 A1 | 10/2019 | Fakoorian et al. | |
| 2020/0128567 A1 | 4/2020 | Zhu et al. | |
| 2020/0329444 A1 | 10/2020 | Cao et al. | |
| 2021/0007137 A1 | 1/2021 | Abouelseoud et al. | |
| 2021/0075675 A1 | 3/2021 | Cavalcanti et al. | |
| 2021/0328736 A1* | 10/2021 | Aijaz | H04L 5/0037 |
| 2022/0239769 A1* | 7/2022 | Ruengeler | H04L 69/323 |

OTHER PUBLICATIONS

International Search Report for PCT/KR2021/014789 by Korean Intellectual Property Office dated Apr. 6, 2022.
European Search Report for PCT/KR2021014789 by European Patent Office dated Oct. 24, 2024.
Khorov, Evgeny et al. "Performance evaluation of Real Time Communications over Wi-Fi," IEEE 802.11-18/1947r3, Mar. 2019.

* cited by examiner

ELECTRONIC DEVICE AND METHOD OF IMMEDIATELY TRANSMITTING REAL-TIME APPLICATION TRAFFIC

CROSS-REFERENCE TO RELATED APPLICATIONS

This application is a continuation of pending PCT international application number PCT/KR2021/014789, filed on Oct. 21, 2021, which is based on and claims the benefit of a Korean patent application number 10-2021-0095608, filed on Jul. 21, 2021, in the Korean Intellectual Property Office, both disclosures of which are incorporated by reference herein in their entirety.

BACKGROUND

1. Field

The disclosure generally relates to a wireless communication, and more particularly to, but not limited to, an electronic device and a method of immediately transmitting real-time application traffic in a wireless communication network.

2. Description of Related Art

Services interacting with environments in real time, such as augmented reality (AR) or robot control services, are attracting attention. Such services are called "real-time services" or "real-time applications (RTAs)", and they are based on communicating and interacting with several people in real time or interacting with an environment in real time, where real-time is a major factor in determining quality of a user experience of a service.

A network service such as wireless fidelity (Wi-Fi) or fifth generation (5G) cellular communication may perform a key function in real-time services. Wi-Fi is a wireless local area network (WLAN) technology that enables an electronic device to access the Internet in a frequency band, such as 2.4 gigahertz (GHz), 5 GHz, 6 GHz, or 60 GHz. In the Wi-Fi, a carrier-sense multiple access with collision avoidance (CSMA/CA) is used as a medium access control protocol, and a device may determine using CSMA/CA whether a wireless medium is currently occupied by another device and may perform transmission after performing backoff for a random period of time if the wireless medium is not used, so that common frequency resources may be shared between the devices.

SUMMARY

A period of time that a device is required to wait until transmission of other devices operating in a network ends and perform random backoff to access the medium may significantly increase transmission latency of real-time services. Accordingly, a technology to reduce latency caused by transmission and reception of traffic in a wireless fidelity (Wi-Fi) network may be needed for real-time services.

Various example embodiments of the present disclosure may provide a technology of immediately transmitting real-time data using a wireless medium when real-time data is generated.

The technical problem to be achieved in the present disclosure is not limited to the technical problem mentioned above, and other technical problems not mentioned above will be clearly understood by one of ordinary skill in the art from the following description.

According to an example embodiment, an electronic device includes at least one wireless communication module configured to transmit and receive wireless signals, at least one processor operatively connected to the wireless communication module, and a memory electrically connected to the processor and configured to store instructions executable by the processor, wherein when the instructions are executed by the processor, the processor is configured to, during transmission of a first data frame including first data through a first resource unit (RU) on a first time resource, in response to detecting second data being enqueued in a transmission queue, transmit a second data frame including the second data through a second RU on a second time resource overlapping the first time resource during the transmission of the first data frame, using the wireless communication module, wherein the first data frame and the second data frame are included in a physical layer protocol data unit (PPDU), and wherein a start time of the second time resource is different from a start time of the first time resource.

According to an example embodiment, an operating method of an electronic device includes transmitting a first data frame including first data through a first RU on a first time resource, and transmitting a second data frame including second data through a second RU on a second time resource overlapping the first time resource during the transmitting of the first data frame, in response to detecting that the second data being enqueued in a transmission queue during the transmitting of the first data frame, wherein the first data frame and the second data frame are included in a PPDU, and a start time of the second time resource is different from a start time of the first time resource.

According to various example embodiments, it may be possible to enhance the quality of a user experience for a real-time application by reducing transmission latency caused by transmission of real-time data by immediately transmitting real-time data using a wireless medium for real-time data when real-time data is generated.

In addition, various effects directly or indirectly ascertained through the present disclosure may be provided.

BRIEF DESCRIPTION OF THE DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
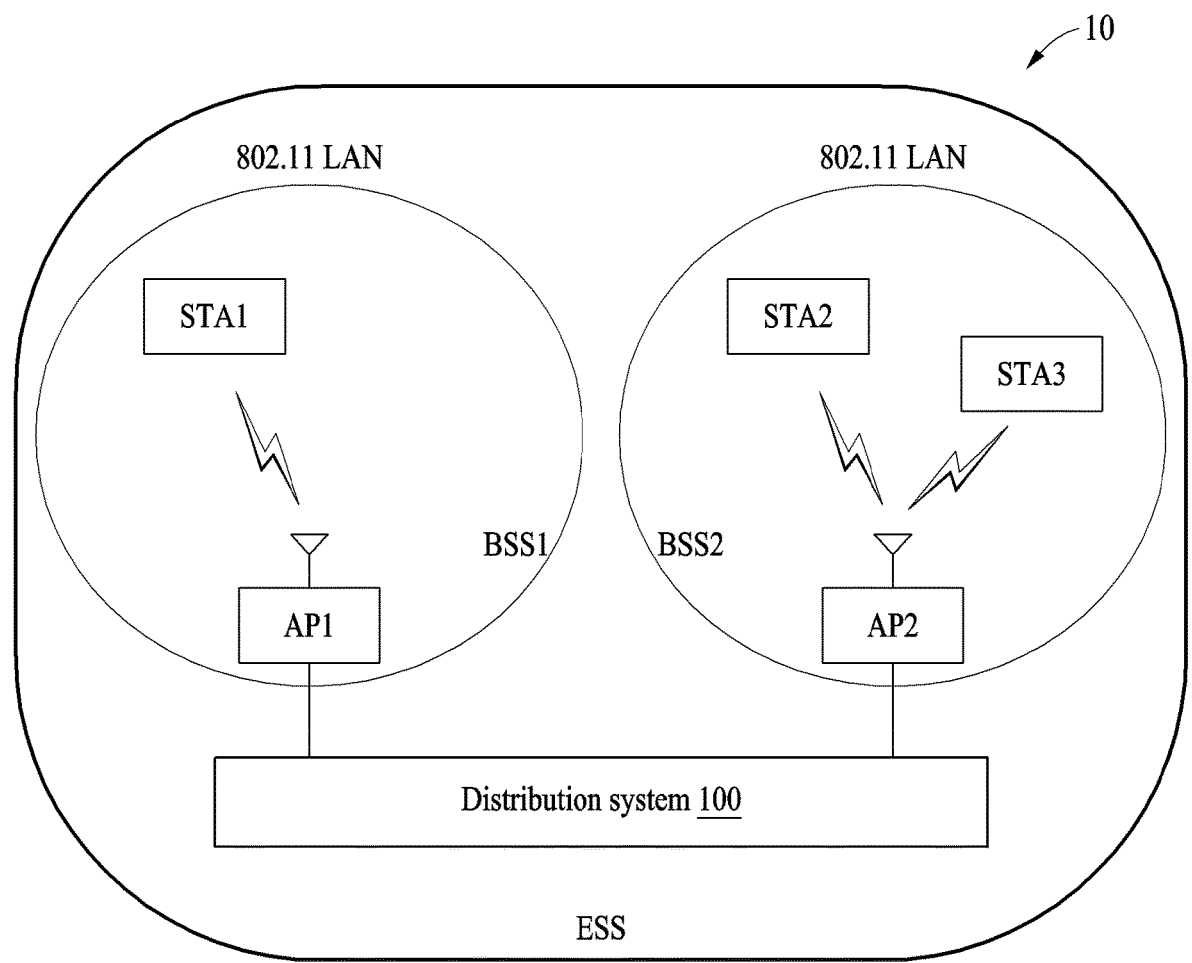
FIG. 1 illustrates an example of a wireless local area network (WLAN) system according to various example embodiments.

Hereinafter, various example embodiments of the disclosure will be described in greater detail with reference to the accompanying drawings. When describing various example embodiments with reference to the accompanying drawings, like reference numerals refer to like elements and a repeated description related thereto may be omitted for clarity and conciseness.

FIG. 1 illustrates an example of a wireless local area network (WLAN) system according to various example embodiments.

Referring to FIG. 1, a WLAN system 10 may be in an infrastructure mode in which one or more access points (APs) are present in a WLAN structure conforming to an institute of electrical and electronic engineers (IEEE) 802.11 standard. An AP may be referred to as an AP STA (station) or an AP device. The other device in the WLAN may be non-AP STAs. An AP STA and a non-AP STA may be collectively called STAs. However, for simplicity of description, in some aspects, only non-AP STA may be referred to as a STA. The STA may also be referred to by various terms such as an "electronic device", a "mobile terminal", a "wireless device", a "wireless transmit/receive unit (WTRU) ", a "user equipment (UE)", a "mobile station (MS)", and a "mobile subscriber unit", or may be simply referred to as a "user".

The WLAN system 10 may include at least one basic service set (BSS), for example, BSS1 and BSS2. The BSS1 or BSS2 may be a set of an AP and one or more STAs, for example, an electronic device 1001, 1002, or 1004 of FIG. 10, which may successfully synchronize with each other to communicate with each other. In FIG. 1, the BSS1 may include AP1 and STA1, and the BSS2 may include AP2 and two or more STAs, for example, STA2 and STA3, which may be associated with an AP, for example, AP2.

According to various example embodiments, the WLAN system 10 may connect at least one STA (e.g., STA1 to STA3), an AP (e.g., AP1 and AP2) that provides a distribution service, and a distribution system 100 that connects a plurality of APs (e.g., AP1 and AP2). The distribution system 100 may implement an extended service set (ESS) by connecting a plurality of BSSs (e.g., BSS 1 and BSS 2). The ESS may be used as a term to denote one network including a plurality of APs (e.g., AP1 and AP2) connected via the distribution system 100. The APs (e.g., AP1 and AP2) included in an ESS may have the same service set identification (SSID).

According to various example embodiments, the STA (e.g., STA1 to STA3) may include a medium access control (MAC) layer and wireless-medium physical (PHY) layer conforming to an IEEE 802.11 standard.

Figure 2:
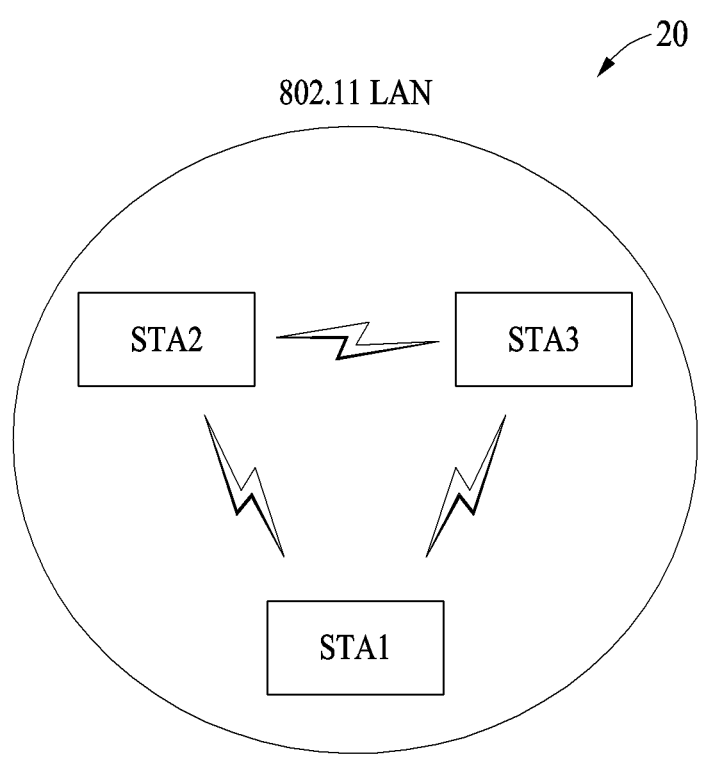
FIG. 2 illustrates another example of a WLAN system according to various example embodiments.

FIG. 2 illustrates another example of a WLAN system according to various example embodiments.

Referring to FIG. 2, a WLAN system 20 may be in an ad-hoc mode in which communication is performed by setting a network between STAs without an AP in a structure of a WLAN of the IEEE 802.11, unlike the WLAN system 10 of FIG. 1. The WLAN system 20 may include a BSS operating in an ad-hoc mode, which is an independent basic service set (IBS S).

According to various example embodiments, in an IBSS, there is no centralized management entity performing a management function at a center. In the IBSS, STAs may be managed in a distributed manner. In the IBSS, all STAs may be non-AP STAs. All the STAs may form a self-contained network because the STAs are not allowed to access a distribution system.

Figure 3:
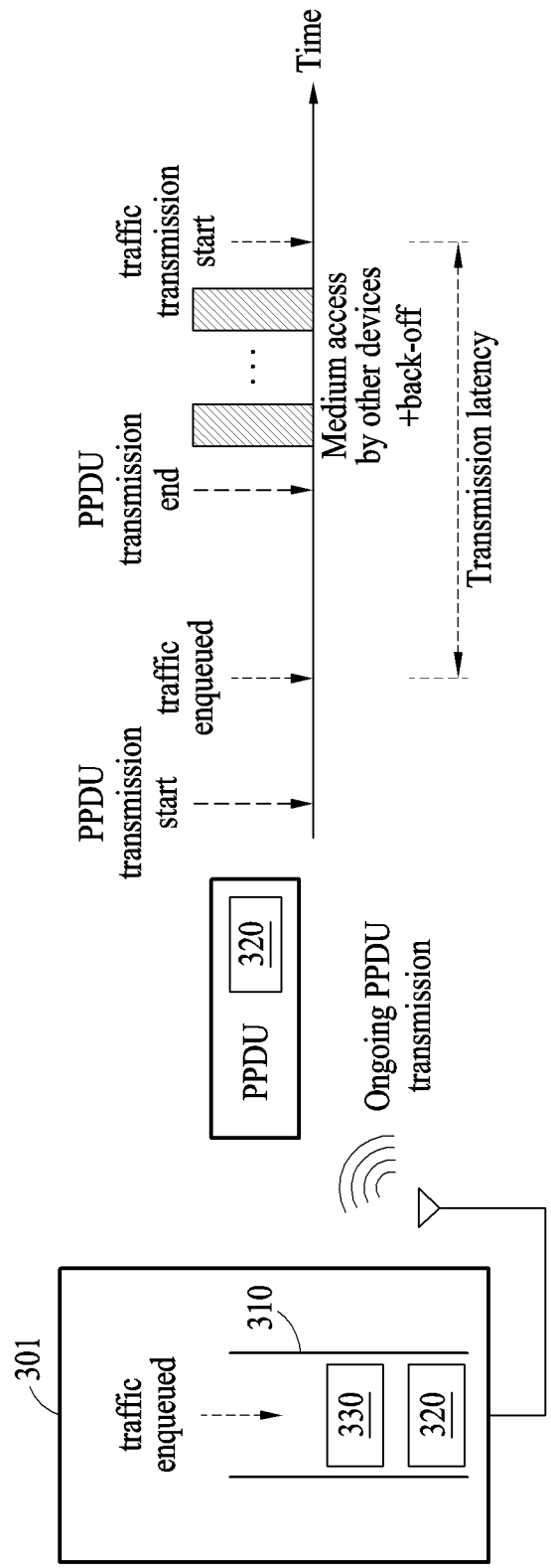
FIG. 3 illustrates an example of a protocol for traffic transmission according to various example embodiments.

FIG. 3 illustrates an example of a protocol for traffic transmission according to various example embodiments.

Figure 10:
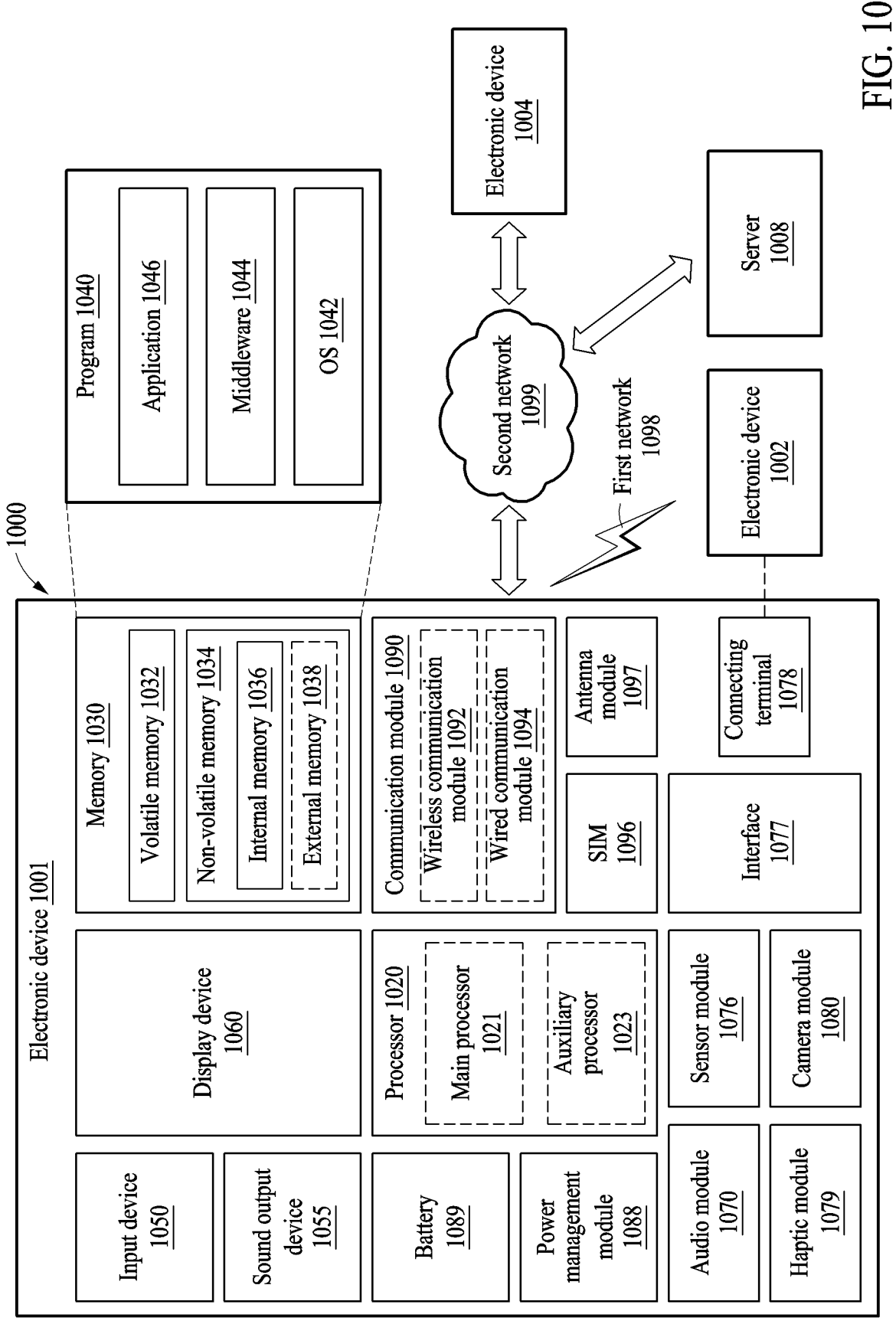
FIG. 10 is a block diagram illustrating an electronic device in a network environment according to various example embodiments.

Referring to FIG. 3, in a wireless communication system (e.g., the WLAN system 10 of FIG. 1, and the WLAN system 20 of FIG. 2), an STA 301 (e.g., an AP or a STA, for example, the electronic device 1001, 1002, or 1004 of FIG. 10) may perform wireless communication using a protocol for regular transmission when data 330 (e.g., traffic) is enqueued in a transmission queue 310. The data 330 may be non-real-time data (e.g., general data), which is not associated with a real-time application.

According to various example embodiments, since a plurality of STAs share common frequency resources in the WLAN system 10 or 20, wireless communication may be performed in an orderly manner according to a carrier-sense multiple access with collision avoidance (CSMA/CA) that is a defined MAC protocol of an IEEE 802.11 standard. An STA may determine whether a wireless medium (e.g., a frequency resource) is currently occupied by another STA. If the wireless medium is in use by another STA, the STA may perform transmission after performing backoff for a random period of time. In order to allow the plurality of STAs to access the wireless medium, an STA with a shortest backoff time among the plurality of STAs may access the wireless medium, and the remaining STAs may stop the remaining backoff time and wait until transmission of the STA accessing the wireless medium is completed. When frame transmission of the STA accessing the wireless medium is completed, the remaining STAs may conduct contention over the remaining backoff time to gain access to transmission resources. In such a manner, common frequency resources may be shared between devices.

According to various example embodiments, the STA 301 may transmit data using a data unit, for example, a physical layer protocol data unit (PPDU) of an IEEE 802.11 standard. The PPDU may include a data frame including data. The data frame may include a PHY preamble, a PHY header, and physical layer service data units (PSDU). The PHY preamble may be used for signal detection, time and frequency synchronization, or channel estimation, and may include a short training field (STF) and a long training field (LTF) including training symbols. The PHY header may include signal field, service field and length field, which are used to transmit TXVECTOR. The PSDU may be a MAC protocol data unit (MPDU) and may be information delivered from/to a MAC layer. The MPDU may be a data unit generated in the MAC layer and may include a MAC header and a MAC service data unit (MSDU).

According to various example embodiments, a structure of the data frame included in the PPDU may be substantially the same as a structure of the data frame included in the PPDU conforming to at least one of IEEE 802.11 family standards including, but not limited to, 802.11a, 802.11g, 802.11n, 802.11ac, 802.11ax, and 802.11be.

According to various example embodiments, the STA 301 may transmit data 320 and 330 according to the CSMA/CA, which may correspond to, e.g., regular transmission. Referring to FIG. 3, the STA 301 may transmit a PPDU including the data 320 (e.g., non-real-time data) according to regular transmission (CSMA/CA). In other words, the STA 301 first checks if the channel is idle. If the channel is idle, the STA 301 may transmit the PPDU including the data 320 after performing backoff for a random period of time. Even if the data 330 (e.g., real-time data) is enqueued in the transmission queue 310 during transmission of the data 320, the STA 301 cannot transmit the data 330 during the transmission of the data 320 because the channel is busy. Accordingly, the STA 301 is required to wait until the transmission of the PPDU including the data 320 ends. Additionally, when the channel is idle, the STA 301 is required to wait for a random backoff period before transmitting a PPDU including the data 330.

According to various example embodiments, transmission latency may refer to a period of time from a first time at which data (e.g., the data 330) is enqueued in the transmission queue 310 to a second time at which the data is finally transmitted via an antenna. When the STA 301 tries to access the wireless medium through contention during transmissions of the other STAs, an operation (e.g., a backoff operation) of waiting for a corresponding time may be involved. Accordingly, in a situation in which a large number of STAs operate together in the WLAN system 10 or 20, the transmission latency may be significantly increased by an amount of time particularly required to perform random backoff.

Figure 4:
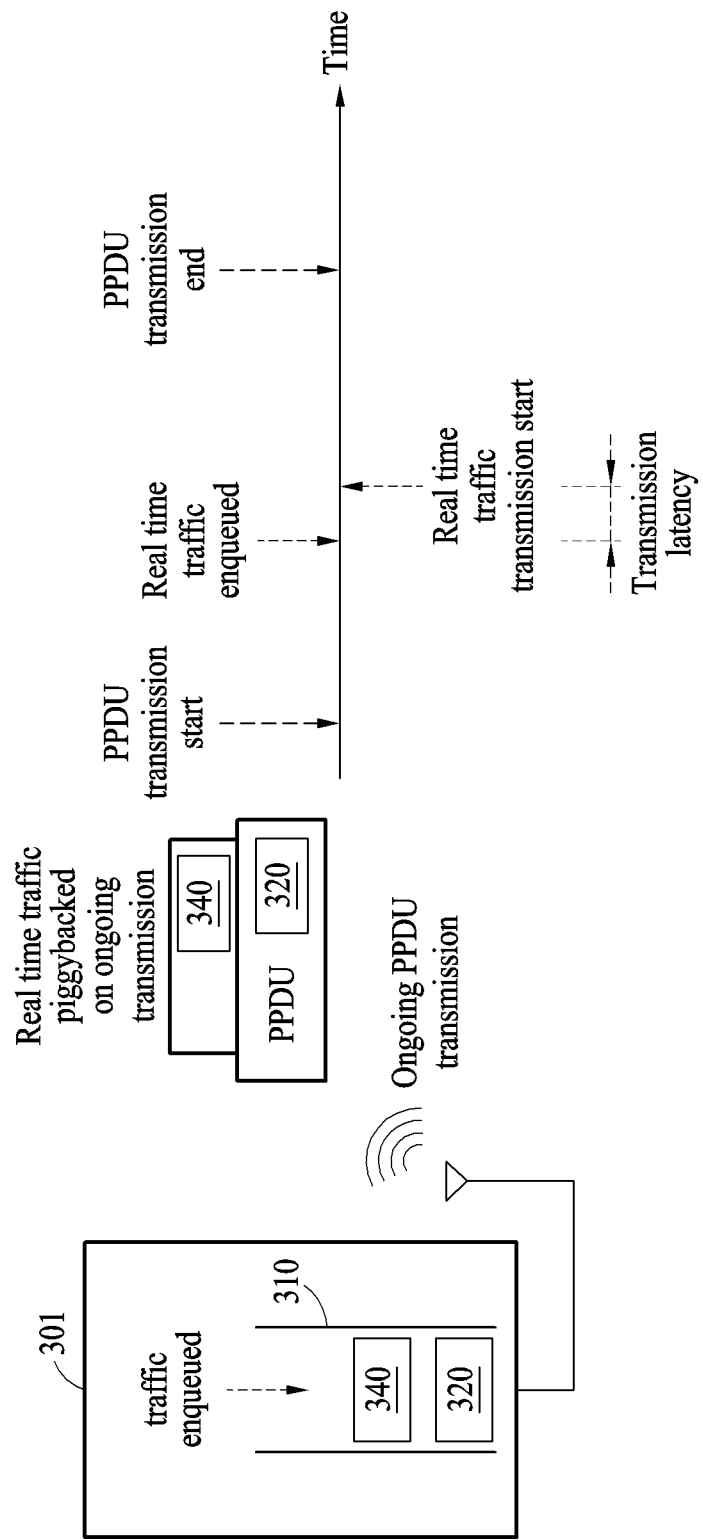
FIG. 4 illustrates another example of a protocol for traffic transmission according to various example embodiments.

FIG. 4 illustrates another example of a protocol for traffic transmission according to various example embodiments.

Referring to FIG. 4, in a wireless communication system (e.g., the WLAN system 10 of FIG. 1 or the WLAN system 20 of FIG. 2), an STA 301 may perform wireless communication using a protocol for immediate transmission of data 340 when the data 340 is enqueued in a transmission queue 310 during transmission of data 320 (e.g., non-real-time data or real-time data) in the WLAN system 10 or 20. The data 340 may be data (e.g., real-time data) associated with a real-time application.

According to various example embodiments, the STA 301 may transmit a PPDU including the data 320 (e.g., non-real-time data) when the channel is sensed idle and the STA 301 gains access to the channel according to the CSMA/CA. If the data 340 (e.g., real-time data) is enqueued in the transmission queue during transmission of the data 320, the STA 301 may piggyback the data 340 to the ongoing PPDU including the data 320 and immediately transmit the data 340 without waiting until transmission of the ongoing PPDU ends, even if the channel (e.g., a resource unit (RU)) for transmission of the data 320 is already occupied by the STA 301.

According to various example embodiments, if the STA 301 transmits the data 340 associated with a real-time application according to the protocol for regular transmission described above with reference to FIG. 3, real-time data may be transmitted after the latency time required to provide a normal user experience for the real-time application, thereby reducing the quality of a user experience for the real-time application. As shown in FIG. 4, however, if real-time data is transmitted according to a protocol for immediate transmission, the STA 301 may transmit the real-time data without performing backoff, immediately after the real-time data is enqueued in the transmission queue 310, thereby reducing transmission latency caused by transmission of the real-time data according to the regular transmission. In a wireless network (for example, but not limited to, an IEEE 802.11be standard network) to which a protocol for immediate transmission of real-time data may be applied, the quality of a user experience for a real-time application may be enhanced by reducing transmission latency caused by transmission of the real-time data according to the protocol for regular transmission.

Figure 5:
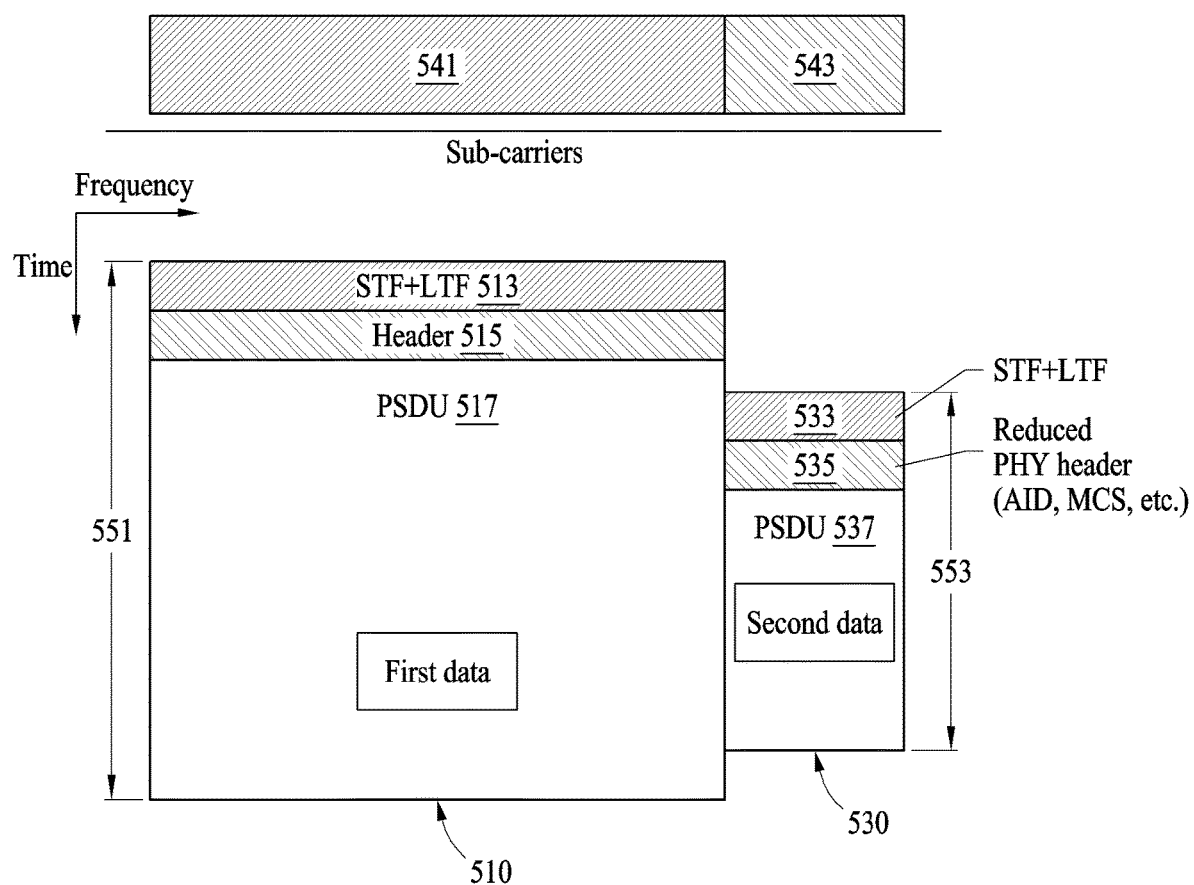
FIG. 5 illustrates a transmission format for immediate transmission of real-time traffic according to various example embodiments.

FIG. 5 illustrates a transmission format for immediate transmission of real-time traffic according to various example embodiments.

FIG. 5 illustrates an example of a transmission format for immediately transmitting real-time data according to a protocol for immediate transmission when the real-time data is enqueued in a transmission queue in the presence of a PPDU that is being transmitted. For convenience of description, the real-time data enqueued in the transmission queue may be assumed as second data.

Referring to FIG. 5, a first data frame 510 including first data may be transmitted through a first RU 541 on a first time resource 551. When the second data is enqueued in a transmission queue (e.g., the transmission queue 310 of FIG. 4) while a PPDU including the first data frame 510 is being transmitted, a second data frame 530 including the second data may be transmitted through a second RU 543 on a second time resource 553 that overlaps the first time resource 551.

According to various example embodiments, the first RU 541 may be different from the second RU 543. The second RU 543 may be an RU reserved for transmission of data (e.g., the second data) associated with a real-time application. For example, the second RU 543 may be a random access resource unit (RARU). For example, a RARU defined in IEEE 802.11ax standard may be used or extended.

According to various example embodiments, a PPDU may include the first data frame 510 and the second data frame 530. The second data frame 530 may be piggybacked to the PPDU transmitting the first data frame 510. The first time resource 551 corresponding to the first data frame 510 may include the second time resource 553 corresponding to the second data frame 530. However, a start time of the first time resource 551 may be different from a start time of the second time resource 553. Additionally, an end time of the first time resource 551 may be the same as or different from an end time of the second time resource 553. A transmission time of the first data frame 510 and a transmission time of the second data frame 530 may not coincide. Since the second RU 543 is occupied on the second time resource 553 even in a state in which the first RU 541 is occupied for transmission of the first data on the first time resource 551, the second data frame 530 may start to be transmitted at a first time different from a second time at which the first data frame 510 starts to be transmitted, during transmission of the first data frame 510.

According to various example embodiments, the first data frame 510 may include a PHY preamble 513, a PHY header 515, and a PSDU 517. The PHY preamble 513 may include an STF and an LTF including training symbols. The PHY header 515 may include a signal field, a service field and a length field, which are used to transmit TXVECTOR. The PSDU 517 may include the first data. A structure of the first data frame 510 may be substantially the same as a structure of a data frame included in the PPDU conforming to at least one of IEEE 802.11 family standards including, but not limited to, 802.11a, 802.11g, 802.11n, 802.11ac, 802.11ax, and 802.11be.

According to various example embodiments, the second data frame 530 may include a PHY preamble 533, a PHY header 535, and a PSDU 537. The PHY preamble 533 may include an STF and an LTF including training symbols. The PHY preamble 533 may be first transmitted during the transmission of the first data frame 510 when the second data that is real-time data is enqueued in the transmission queue, so that signal detection and/or channel estimation may be performed first, and thus an STA receiving the second data frame 530 may normally perform a data demodulation operation. After the PHY preamble 533 is transmitted, the PHY header 535 (e.g., a reduced PHY header) including an association ID (AID) for STA identification, modulation and coding scheme (MCS) for data decoding, and spatial allocation information may be transmitted, and then the PSDU 537 including the second data may be transmitted.

According to various example embodiments, when the second data that is real-time data is enqueued in the transmission queue (e.g., the transmission queue 310 of FIG. 4) while an STA (e.g., the STA 301 of FIG. 4) is transmitting the PPDU including the first data frame 510, the STA may additionally occupy the second RU 543 for immediate transmission of real-time data and transmit the second data frame 530. In other words, one STA may occupy multiple RUs (e.g., multiple RUs of the IEEE 802.11be) to perform transmission. In addition, the STA (e.g., the STA 301 of FIG. 4) that does not participate in regular transmission in which the PPDU including the first data frame 510 is transmitted may immediately transmit new second data by occupying the second RU 543 when the new second data that is real-time data is enqueued while the PPDU is being transmitted.

According to various example embodiments, a protocol for immediate transmission of real-time data may be performed in both uplink transmission and downlink transmission.

Figure 6:
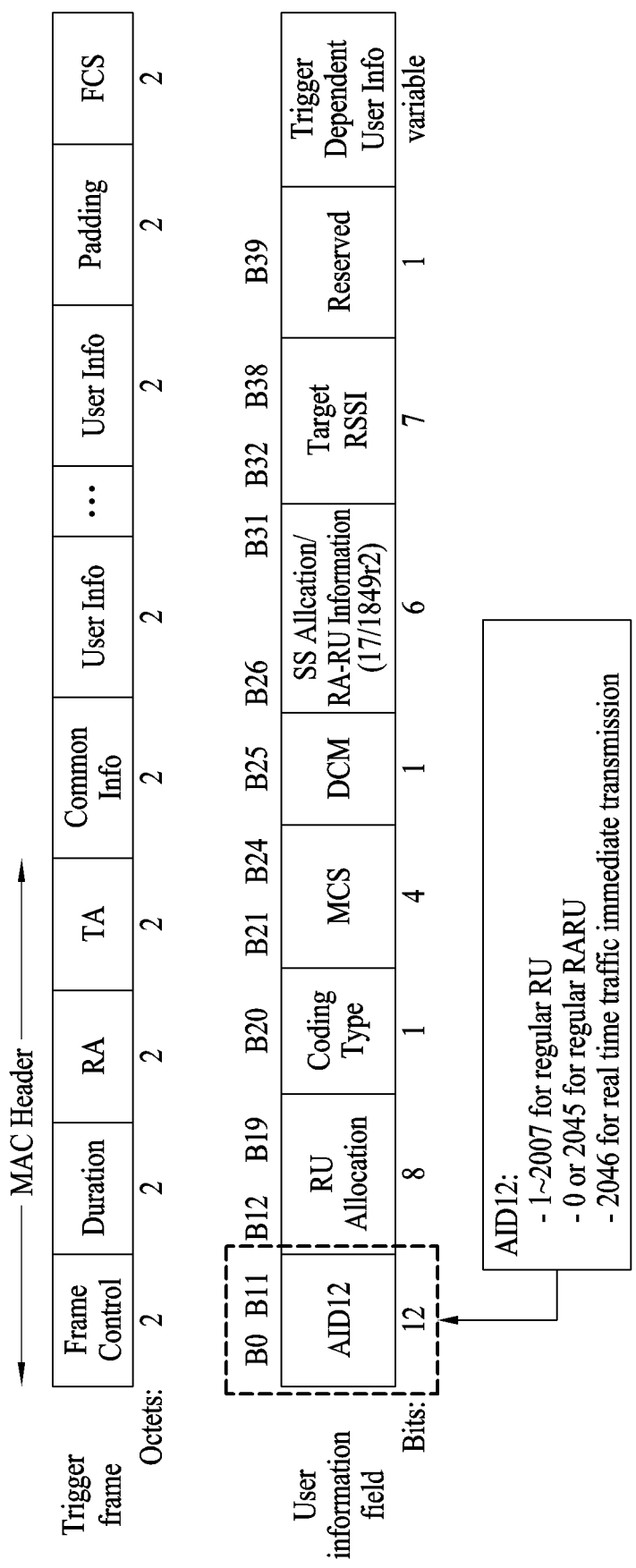
FIG. 6 illustrates an example of a trigger frame and a user information field for immediate transmission of real-time traffic according to various example embodiments.

FIG. 6 illustrates an example of a trigger frame and a user information field for immediate transmission of real-time traffic according to various example embodiments.

Referring to FIG. 6, when real-time data is enqueued while a wireless medium (e.g., an RU) is occupied by a transmitting STA and the occupied wireless medium is used to immediately transmit the real-time data, regular transmission and reception of data may be interrupted by interference. An RU for immediate transmission of real-time data may need to be additionally defined and included. In one or more embodiments, a RARU defined in the IEEE 802.11ax standard may be used or extended for the RU for immediate transmission of real-time data. A value indicating that the RU for immediate transmission of real-time data is reserved for transmission of data associated with a real-time application may be included in a user identifier field (or an AID12 field) that is a subfield of a user information field in a trigger frame transmitted by an AP.

According to various example embodiments, the trigger frame may allocate resources for uplink transmission (e.g., uplink multiple-user (MU) transmission), and may be transmitted by a STA (e.g., an AP). Referring to FIG. 6, the trigger frame may be a MAC frame, and may include a frame control field, a duration field, an RA field, a TA field, a common information field, one or more user information fields (e.g., User Info), a padding field, and a frame check sequence field. The frame control field may include information about a version of a MAC protocol and other additional control information, and the duration field may include time information to configure a network allocation vector (NAV) or information about an identifier (e.g., an AID) of an STA. The RA field may include address information of an STA that receives a corresponding trigger frame and may be omitted if necessary. The TA field may include address information of an STA (e.g., an AP) that transmits a corresponding trigger frame, and the common information field may include common control information applied to one or more receiving STAs that receive the trigger frame. A user information field may include individual user information fields, each of which respectively corresponds to each of receiving STAs that receive the trigger frame.

According to various example embodiments, each user information field may include a plurality of subfields. A portion of the subfields may be omitted, other subfields may be added, and a length of each subfield may be changed. The user information field may include a user identifier field (e.g., an AID12 field), an RU allocation field, a coding type field, an MCS field, a dual carrier modulation (DCM) field, a RARU information field (e.g., an SS allocation/RA-RU information field), a target received signal strength indicator (RSSI) field, a reserved field, and a trigger-dependent user information field.

According to various example embodiments, the user identifier field may include an identifier (e.g., an AID12). A value assigned to an AID12 may indicate a type of wireless media (e.g., an RU or a RARU). For example, a value assigned to the AID12 may indicate that a wireless medium is an RU (e.g., a regular RU), a RARU (e.g., a regular RARU), or a RARU for immediate transmission of data associated with a real-time application.

According to various example embodiments, values "1" to "2007" may be assigned to the AID12 to indicate that a wireless medium is an RU. For example, a unique value in the range of "1" to "2007" may be assigned to the AID12 for each STA (e.g., non-AP STA or electronic device 1001, 1002, or 1004 of FIG. 10) connected to an AP to identify the STA in a BSS. In this example, the user identifier field may include an identifier of an STA (i.e., a receiving STA) corresponding to the user information field, and the RU allocation field may include RU information assigned to the corresponding STA.

According to various example embodiments, a value of "0" or "2045" may be assigned to the AID12 to indicate that the wireless medium is a RARU. For example, the AID12 may have "0" or "2045" as a value that is not assigned to an STA connected to an AP, which may indicate that the wireless medium is a RARU that may be available by all STAs. In this example, the RARU information field may include, for example, information about a number of RARUs allocated.

According to various example embodiments, a value of "2046" may be assigned to the AID12 to indicate that the wireless medium is a RARU for immediate transmission of data associated with a real-time application. The value of "2046" assigned to the AID12 may also indicate that the RARU is reserved for transmission of data associated with a real-time application. By extending the RARU defined in the IEEE 802.11ax standard, a value of an AID12 to indicate a separate RARU reserved for immediate transmission of data associated with a real-time application may be additionally or alternatively defined. In addition, RARU allocation for immediate transmission of data associated with a real-time application may be performed in both uplink transmission and downlink transmission.

Figure 7:
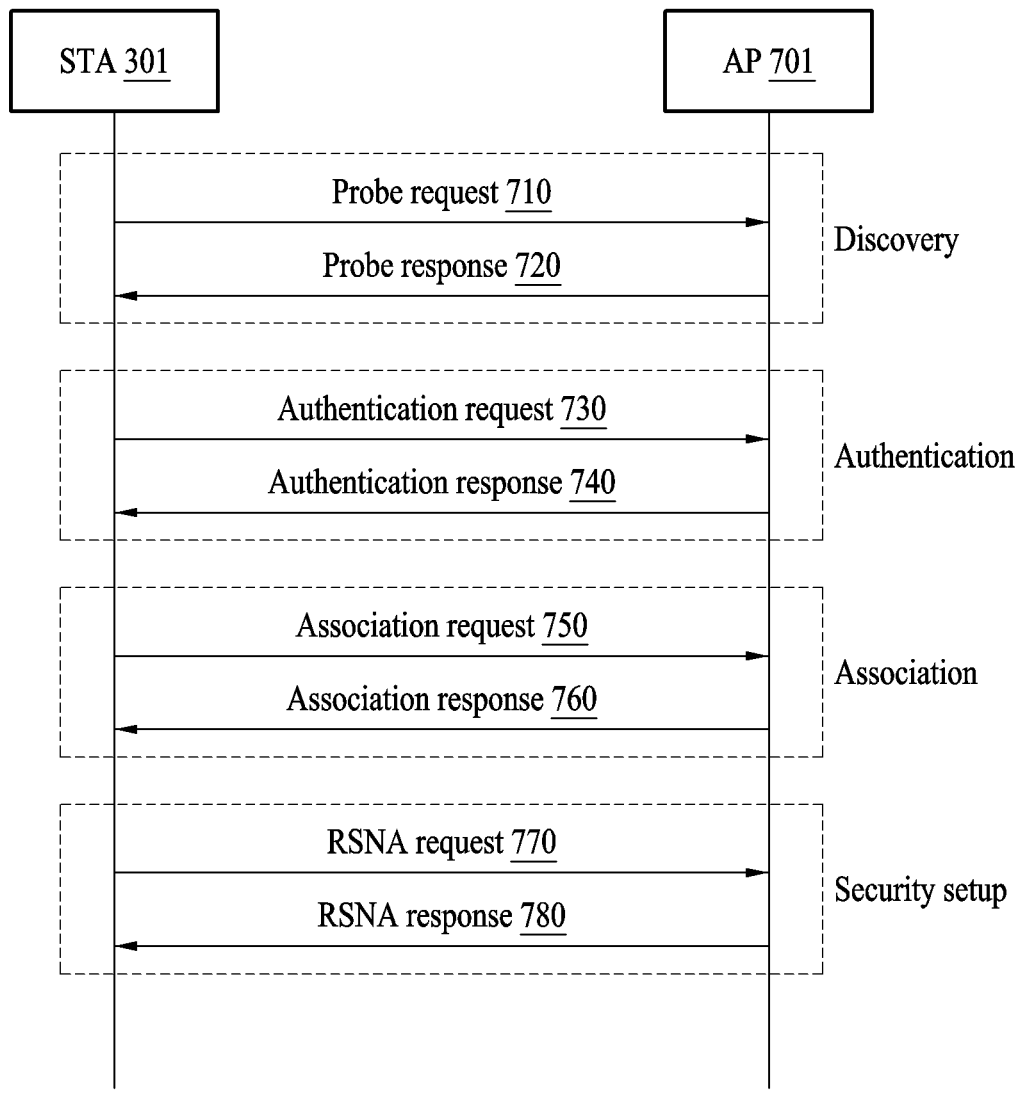
FIG. 7 illustrates a link setup operation for immediate transmission of real-time traffic according to various example embodiments.

FIG. 7 illustrates a link setup operation for immediate transmission of real-time traffic according to various example embodiments.

Referring to FIG. 7, whether to support an operation of immediately transmitting real-time traffic may be negotiated between devices (e.g., an STA 301 and an AP 701) during the link setup operation. For link setup, a network discovery, authentication, association, and security setup operations may be performed. The link setup operation may also be referred to as a "session initiation operation" or a "session setup operation". In addition, discovery, authentication, association, and security setup operations in the link setup operation may be collectively referred to as an "association operation."

According to various example embodiments, a network discovery operation may include operations 710 and 720. In operation 710, the STA 301 (e.g., the electronic device 1001, 1002, or 1004 of FIG. 10) may transmit a probe request frame to probe which AP is present, and may wait for a response to the probe request frame. The STA 301 may perform a scanning operation to find and access a network so as to participate in the network. The scanning operation may include an active scanning operation and a passive scanning operation. In operation 720, the AP 701 may transmit a probe response frame in response to the probe request frame to the STA 301 that transmits the probe request frame.

According to various example embodiments, after the STA 301 discovers the network, an authentication operation including operations 730 and 740 may be performed. In operation 730, the STA 301 may transmit an authentication request frame to the AP 701. In operation 740, the AP 701 may determine whether to allow authentication for the STA 301 based on information included in the authentication request frame. The AP 701 may provide the STA 301 with a result of an authentication process through an authentication response frame. An authentication frame used for authentication request/response may correspond to a management frame compliant to an IEEE 802.11 standard.

According to various example embodiments, after the STA 301 is successfully authenticated, an association operation including operations 750 and 760 may be performed. In operation 750, the STA 301 may transmit an association request frame to the AP 701. In operation 760, the AP 701 may transmit an association response frame to the STA 301 in response to the association request frame.

According to various example embodiments, the association request frame and/or the association response frame may include information related to various capabilities for STA 301 or AP 701. Whether to support an immediate transmission operation may be determined based on information related to various capabilities included in the association request frame and/or the association response frame. A capability information indicating whether to support the immediate transmission operation may be included in a field of a capability information element (e.g., a capability information element of the IEEE 802.11be). A capability information indicating whether to support the immediate transmission operation is set and may be shared in the association operation performed between the STA 301 and the AP 701.

According to various example embodiments, after the STA 301 is successfully associated with the network, a security setup operation including operations 770 and 780 may be performed. That is, in operation 770, the STA 301 may transmit the RSNA request frame to the AP 701. In operation 780, the AP 701 may transmit the RSNA response frame to the STA 301 in response to the RSNA request frame. The security setup operation may be performed using a robust security network association (RSNA) request frame and/or an RSNA response frame according to an IEEE 802.11 standard. The security setup operation may also be performed according to a security scheme that is not defined in the IEEE 802.11 standard.

Figure 8:
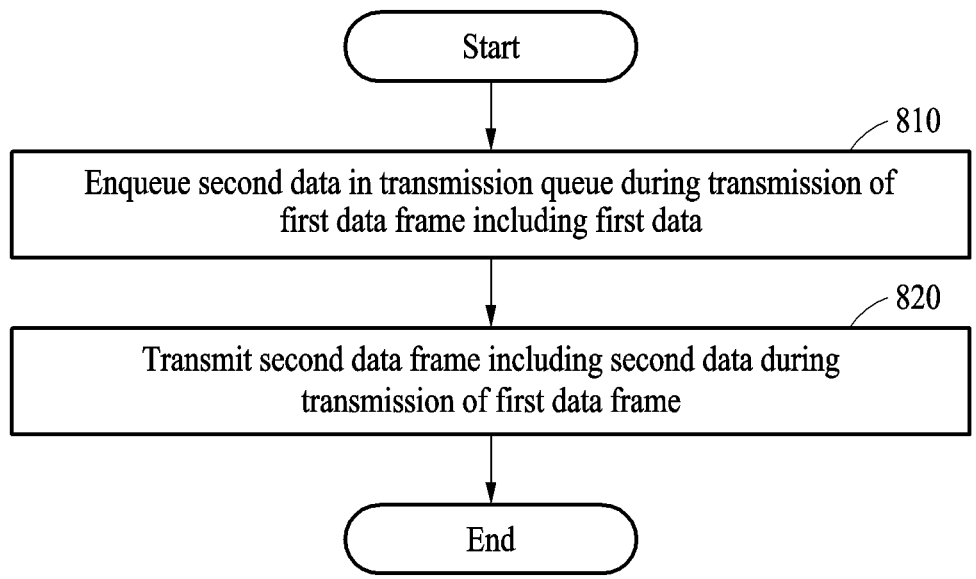
FIG. 8 is a flowchart illustrating an example of immediate transmission of real-time traffic according to various example embodiments.

FIG. 8 is a flowchart illustrating an example of immediate transmission of real-time traffic according to various example embodiments.

In operation 810, during transmission of a first data frame including first data, second data may be enqueued in a transmission queue 310 of an STA 301 (e.g., the electronic device 1001, 1002, or 1004 of FIG. 10). The second data may be enqueued while the first data frame is being transmitted through a first RU on a first time resource. The first data frame may be transmitted by an STA other than the STA 301 (e.g., the electronic device 1001, 1002, or 1004 of FIG. 10), and the STA 301 may be in a state of not participating in regular transmission in which a PPDU including a first data stream (e.g., the first data frame 510 of FIG. 5) is transmitted. The second data may be enqueued in the transmission queue 310 of the STA 301. The second data may be enqueued in the transmission queue 310 during the transmission of the first data frame or may be enqueued in the transmission queue 310 before transmission of a second data frame.

In operation 820, the STA 301 may transmit a second data frame including the second data through a second RU on a second time resource overlapping the first time resource during the transmission of the first data frame, in response to detecting that the second data being enqueued in the transmission queue. The first data frame and the second data frame may be included in a PPDU, and a start time of the second time resource may be different from a start time of the first time resource.

Figure 9:
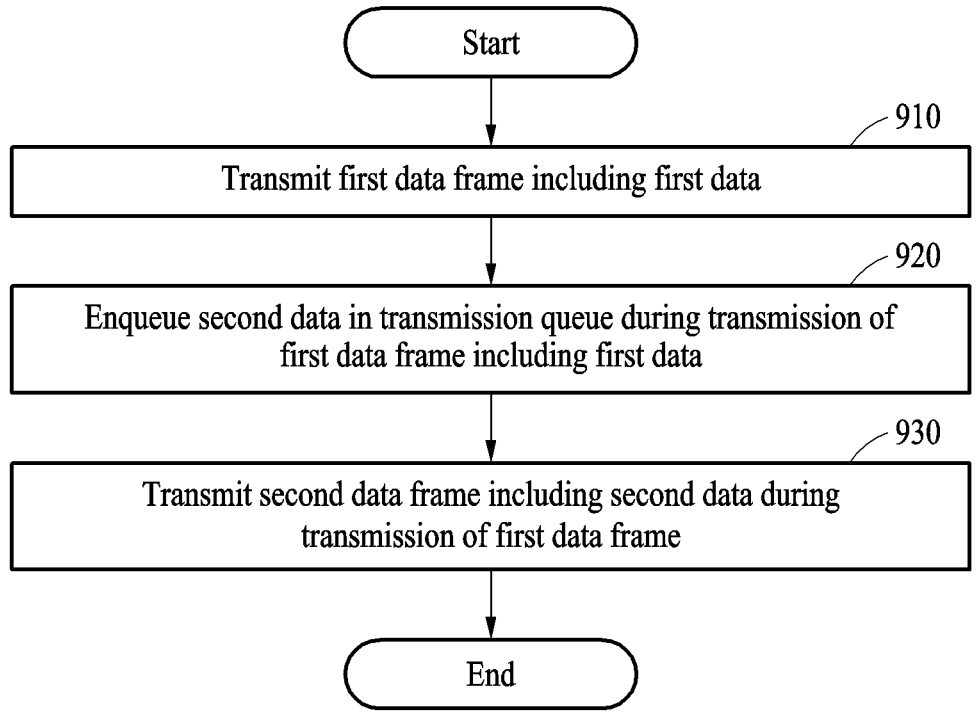
FIG. 9 is a flowchart illustrating another example of immediate transmission of real-time traffic according to various example embodiments.

FIG. 9 is a flowchart illustrating another example of immediate transmission of real-time traffic according to various example embodiments.

In operation 910, an STA 301 (e.g., the electronic device 1001, 1002, or 1004 of FIG. 10) may transmit a first data frame including first data through a first RU on a first time resource.

In operation 920, second data may be enqueued in a transmission queue 310 of the STA 301 during transmission of the first data frame including the first data.

In operation 930, the STA 301 may transmit a second data frame including the second data through a second RU on a second time resource overlapping the first time resource during the transmission of the first data frame, in response to detecting that the second data being enqueued in the transmission queue. The first data frame and the second data frame may be included in a PPDU, and a start time of the second time resource may be different from a start time of the first time resource.

According to various example embodiments, the STA 301 may perform transmission by occupying multiple RUs (e.g., multiple RUs of the IEEE 802.11be).

FIG. 10 is a block diagram illustrating the electronic device 1001 in a network environment 1000 according to various example embodiments. Referring to FIG. 10, the electronic device 1001 in the network environment 1000 may communicate with the electronic device 1002 via a first network 1098 (e.g., a short-range wireless communication network), or communicate with at least one of the electronic device 1004 or a server 1008 via a second network 1099 (e.g., a long-range wireless communication network). According to an example embodiment, the electronic device 1001 may communicate with the electronic device 1004 via the server 1008. According to an example embodiment, the electronic device 1001 may include a processor 1020, a memory 1030, an input device 1050, a sound output device 1055, a display device 1060, an audio module 1070, and a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some example embodiments, at least one (e.g., the connecting terminal 1078) of the above components may be omitted from the electronic device 1001, or one or more other components may be added in the electronic device 1001. In some example embodiments, some (e.g., the sensor module 1076, the camera module 1080, or the antenna module 1097) of the components may be integrated as a single component (e.g., the display device 1060).

The processor 1020 may execute, for example, software (e.g., a program 1040) to control at least one other component (e.g., a hardware or software component) of the electronic device 1001 connected to the processor 1020, and may perform various data processing or computation. According to an example embodiment, as at least a part of data processing or computation, the processor 1020 may store a command or data received from another component (e.g., the sensor module 1076 or the communication module 1090) in a volatile memory 1032, process the command or the data stored in the volatile memory 1032, and store resulting data in a non-volatile memory 1034. According to an example embodiment, the processor 1020 may include a main processor 1021 (e.g., a central processing unit (CPU) or an application processor) or an auxiliary processor 1023 (e.g., a graphics processing unit (GPU), a neural processing unit (NPU), an image signal processor (ISP), a sensor hub processor, or a communication processor (CP)) that is operable independently of, or in conjunction with the main processor 1021. For example, when the electronic device 1001 includes the main processor 1021 and the auxiliary processor 1023, the auxiliary processor 1023 may be adapted to consume less power than the main processor 1021 or to be specific to a specified function. The auxiliary processor 1023 may be implemented separately from the main processor 1021 or as a part of the main processor 1021.

The auxiliary processor 1023 may control at least some of functions or states related to at least one (e.g., the display device 1060, the sensor module 1076, or the communication module 1090) of the components of the electronic device 1001, instead of the main processor 1021 while the main processor 1021 is in an inactive (e.g., sleep) state or along with the main processor 1021 while the main processor 1021 is an active state (e.g., executing an application). According to an example embodiment, the auxiliary processor 1023 (e.g., an ISP or a CP) may be implemented as a portion of another component (e.g., the camera module 1080 or the communication module 1090) that is functionally related to the auxiliary processor 1023. According to an example embodiment, the auxiliary processor 1023 (e.g., an NPU) may include a hardware structure specified for artificial intelligence model processing. An artificial intelligence model may be generated by machine learning. Such learning may be performed by, for example, the electronic device 1001 in which artificial intelligence is performed, or may be performed via a separate server (e.g., the server 1008). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored as software in the memory 1030, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, a keyboard, a key (e.g., a button), or a digital pen (e.g., a stylus pen).

The sound output device 1055 may output a sound signal to the outside of the electronic device 1001. The sound output device 1055 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display device 1060 may visually provide information to the outside (e.g., a user) of the electronic device 1001. The display device 1060 may include, for example, a control circuit for controlling a display, a hologram device, or a projector and control circuitry to control a corresponding one of the display, the hologram device, and the projector. According to an example embodiment, the display device 1060 may include a touch sensor adapted to sense a touch, or a pressure sensor adapted to measure an intensity of a force incurred by the touch.

The audio module 1070 may convert a sound into an electric signal or vice versa. According to an example embodiment, the audio module 1070 may obtain the sound via the input device 1050 or output the sound via the sound output device 1055 or an external electronic device (e.g., the electronic device 1002 such as a speaker or a headphone) directly or wirelessly connected to the electronic device 1001.

The sensor module 1076 may detect an operational state (e.g., power or temperature) of the electronic device 1001 or an environmental state (e.g., a state of a user) external to the electronic device 1001, and generate an electric signal or data value corresponding to the detected state. According to an example embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an example embodiment, the interface 1077 may include, for example, a high-definition multimedia interface (HDMI), a universal serial bus (USB) interface, a secure digital (SD) card interface, or an audio interface.

The connecting terminal 1078 may include a connector via which the electronic device 1001 may be physically connected to an external electronic device (e.g., the electronic device 1002). According to an example embodiment, the connecting terminal 1078 may include, for example, an HDMI connector, a USB connector, an SD card connector, or an audio connector (e.g., a headphone connector).

The haptic module 1079 may convert an electric signal into a mechanical stimulus (e.g., a vibration or a movement) or an electrical stimulus which may be recognized by a user via his or her tactile sensation or kinesthetic sensation. According to an example embodiment, the haptic module 1079 may include, for example, a motor, a piezoelectric element, or an electric stimulator.

The camera module 1080 may capture still images and moving images. According to an example embodiment, the camera module 1080 may include one or more lenses, image sensors, image signal processors, or flashes.

The power management module 1088 may manage power supplied to the electronic device 1001. According to an example embodiment, the power management module 1088 may be implemented as, for example, at least a part of a power management integrated circuit (PMIC).

The battery 1089 may supply power to at least one component of the electronic device 1001. According to an example embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently of the processor 1020 (e.g., an application processor) and that support a direct (e.g., wired) communication or a wireless communication. According to an example embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module, or a power line communication (PLC) module). A corresponding one of these communication modules may communicate with the external electronic device 1004 via the first network 1098 (e.g., a short-range communication network, such as Bluetooth™, wireless fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the SIM 1096.

The wireless communication module 1092 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., a mmWave band) to achieve, e.g., a high data transmission rate. The wireless communication module 1092 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 1092 may support various requirements specified in the electronic device 1001, an external electronic device (e.g., the electronic device 1004), or a network system (e.g., the second network 1099). According to an example embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an example embodiment, the antenna module 1097 may include an antenna including a radiating element including a conductive material or a conductive pattern formed in or on a substrate (e.g., a printed circuit board (PCB)). According to an example embodiment, the antenna module 1097 may include a plurality of antennas (e.g., array antennas). In such a case, at least one antenna appropriate for a communication scheme used in a communication network, such as the first network 1098 or the second network 1099, may be selected by, for example, the communication module 1090 from the plurality of antennas. The signal or the power may be transmitted or received between the communication module 1090 and the external electronic device via the at least one selected antenna. According to an example embodiment, another component (e.g., a radio frequency integrated circuit (RFIC)) other than the radiating element may be additionally formed as a part of the antenna module 1097.

According to various example embodiments, the antenna module 1097 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 1001 and the external electronic device 1004 via the server 1008 coupled with the second network 1099. Each of the external electronic devices 1002 and 1004 may be a device of the same type as or a different type from the electronic device 1001. According to an example embodiment, all or some of operations to be executed by the electronic device 1001 may be executed at one or more of the external electronic devices 1002 and 1004, or the server 1008. For example, if the electronic device 1001 needs to perform a function or a service automatically, or in response to a request from a user or another device, the electronic device 1001, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In an example embodiment, the external electronic device 1004 may include an Internet-of-things (IoT) device. The server 1008 may be an intelligent server using machine learning and/or a neural network. According to an example embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

An electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

various example embodiments as set forth herein may be implemented as software (e.g., the program 1040) including one or more instructions that are stored in a storage medium (e.g., an internal memory 1036 or an external memory 1038) that is readable by a machine (e.g., the electronic device 1001) For example, a processor (e.g., the processor 1020) of the machine (e.g., the electronic device 1001) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

According to various example embodiments, an electronic device (e.g., the electronic device 1001 of FIG. 10) may include at least one wireless communication module (e.g., the wireless communication module 1092 of FIG. 10) configured to transmit and receive wireless signals, at least one processor (e.g., the processor 1020 of FIG. 10) operatively connected to the wireless communication module, and a memory (e.g., the memory 1030 of FIG. 10) electrically connected to the processor and configured to store instructions executable by the processor. When the instructions are executed by the processor, the processor may, during transmission of a first data frame (e.g., the first data frame 510 of FIG. 5) including first data through a first RU (e.g., the first RU 541 of FIG. 5) on a first time resource (e.g., the first time resource 551 of FIG. 5), in response to detecting second data being enqueued in a transmission queue (e.g., the transmission queue 310 of FIG. 4), transmit a second data frame (e.g., the second data frame 530 of FIG. 5) including the second data through a second RU (e.g., the second RU 543 of FIG. 5) on a second time resource (e.g., the second time resource 553 of FIG. 5) overlapping the first time resource during the transmission of the first data frame, using the wireless communication module. The first data frame and the second data frame may be included in a PPDU, and a start time of the second time resource may be different from a start time of the first time resource.

According to various example embodiments, the processor may start transmission of the second data frame at a first time different from a second time at which the first data frame is transmitted during the transmission of the first data frame without performing backoff.

According to various example embodiments, the second data may be associated with a real-time application.

According to various example embodiments, the second RU may be an RU reserved for transmission of the data associated with the real-time application.

According to various example embodiments, the second RU may be a RARU.

According to various example embodiments, information indicating that the second RU is reserved for transmission of the data associated with the real-time application may be included in a user identifier field (e.g., the user identifier field of FIG. 6) of a user information field (e.g., the user information field of FIG. 6) in a trigger frame (e.g., the trigger frame of FIG. 6) transmitted by an AP.

According to various example embodiments, the processor may transmit a PHY preamble (e.g., the PHY preamble 533 of FIG. 5) and a PHY header (e.g., the PHY header 535 of FIG. 5) that are included in the second data frame, in response to the second data being enqueued in the transmission queue.

According to various example embodiments, whether to support an operation of immediately transmitting the second data frame during the transmission of the first data frame may be determined based on capability-related information.

According to various example embodiments, the capability-related information may be included in one field of a capability information element of the IEEE 802.11be.

According to various example embodiments, the capability-related information may be shared in an association operation between the electronic device and an external device.

According to various example embodiments, an operating method of an electronic device (e.g., the electronic device 1001 of FIG. 10) may include transmitting (e.g., operation 910 of FIG. 9) a first data frame (e.g., the first data frame 510 of FIG. 5) including first data through a first RU (e.g., the first RU 541 of FIG. 5) on a first time resource (e.g., the first time resource 551 of FIG. 5), and transmitting (e.g., operations 920 and 930 of FIG. 9) a second data frame (e.g., the second data frame 530 of FIG. 5) including second data through a second RU (e.g., the second RU 543 of FIG. 5) on a second time resource (e.g., the second time resource 553 of FIG. 5) overlapping the first time resource during the transmitting of the first data frame, in response to the second data being enqueued in a transmission queue (e.g., the transmission queue 310 of FIG. 4) during the transmitting of the first data frame. The first data frame and the second data frame may constitute one PPDU, and a start time of the second time resource may be different from a start time of the first time resource.

According to various example embodiments, the transmitting of the second data frame may include starting transmission of the second data frame at a first time different from a second time at which the first data frame is transmitted during the transmission of the first data frame without performing backoff.

According to various example embodiments, the second data may be data associated with a real-time application.

According to various example embodiments, the second RU may be an RU reserved for transmission of the data associated with the real-time application.

According to various example embodiments, the second RU may be a RARU.

According to various example embodiments, information indicating that the second RU is reserved for transmission of the data associated with the real-time application may be included in a user identifier field (e.g., the user identifier field of FIG. 6) of a user information field (e.g., the user information field of FIG. 6) in a trigger frame (e.g., the trigger frame of FIG. 6) transmitted by an AP.

According to various example embodiments, the transmitting of the second data frame may include transmitting a PHY preamble (e.g., the PHY preamble 533 of FIG. 5) and a PHY header (e.g., the PHY header 535 of FIG. 5) that are included in the second data frame, in response to the second data being enqueued in the transmission queue.

According to various example embodiments, whether to support an operation of immediately transmitting the second data frame during the transmission of the first data frame may be set for capability-related information.

According to various example embodiments, the capability-related information may be included in one field of a capability information element of the IEEE 802.11be.

According to various example embodiments, the capability-related information may be shared in an association operation between the electronic device and an external device.

According to various example embodiments, a method for wireless communication by an electronic device may include during transmission of first data through a first resource unit, detecting that second data is enqueued in a transmission queue of the electronic device, the second data being classified as a first type of data, and transmitting the second data, without performing backoff, through a second resource unit during the transmission of the first data, the second resource unit being allocated for transmission for the first type of data. The transmission of the second data is started later than the transmission of the first data.

According to various example embodiments, the first type of data is associated with a real-time application.

According to various example embodiments, the first data is classified as a second type of data which is not associated with a real-time application According to various example embodiments, the first data is required to perform backoff for a random period of time before being transmitted According to various example embodiments, the first data is transmitted by the electronic device.

According to various example embodiments, the first data is transmitted by another electronic device.

According to various example embodiments, the first resource unit is a first group of subcarriers and the second resource unit is a second group of subcarriers, and the first resource unit and second resource unit are not overlapped with each other.

According to various example embodiments, the second resource unit is allocated in a trigger frame transmitted by an access point.

According to various example embodiments, whether to support transmission of the second data during the transmission of the first data is determined by negotiation between the electronic device and an access point

What is claimed is:

1. An electronic device comprising:
at least one wireless communication circuit configured to transmit and receive wireless signals;
at least one processor operatively connected to the wireless communication circuit; and
a memory electrically connected to the processor and configured to store instructions executable by the processor,
wherein when the instructions are executed by the processor, the processor is configured to, during ongoing transmission of a first data frame including first data through a first resource unit (RU) on a first time resource, in response to detecting second data being enqueued in a transmission queue, transmit a second data frame including the second data through a second RU on a second time resource overlapping the first time resource during the transmission of the first data frame, using the wireless communication circuit, wherein the first RU is different from the second RU,
wherein the second data frame is piggybacked onto the ongoing transmission of the first data frame such that the first data frame and the second data frame are included in a physical layer protocol data unit (PPDU),
wherein a start time of the second time resource is different from a start time of the first time resource, and
wherein the first data is non-real time data and the second data is real time data.

2. The electronic device of claim 1, wherein the processor is further configured to start transmission of the second data frame at a first time different from a second time of starting transmission of the first data frame, without performing backoff.

3. The electronic device of claim 1, wherein the second data is associated with a real-time application.

4. The electronic device of claim 3, wherein the second RU is reserved for transmission of the data associated with the real-time application.

5. The electronic device of claim 1, wherein the second RU is a random access resource unit.

6. The electronic device of claim 4, wherein information indicating that the second RU is reserved for transmission of the data associated with the real-time application is included in a trigger frame transmitted by an access point.

7. The electronic device of claim 1, wherein the processor is further configured to transmit a physical layer (PHY) preamble and a PHY header that are included in the second data frame when the second data is enqueued in the transmission queue.

8. The electronic device of claim 1, wherein whether to support an operation of immediately transmitting the second data frame during the transmission of the first data frame is determined based on capability-related information.

9. The electronic device of claim 8, wherein the capability-related information is included in an association request frame or an association response frame.

10. The electronic device of claim 8, wherein the capability-related information is shared in an association operation between the electronic device and an external device.

11. An operating method of an electronic device, the method comprising:
transmitting a first data frame including first data through a first resource unit (RU) on a first time resource; and
transmitting a second data frame including second data through a second RU on a second time resource overlapping the first time resource during the transmitting of the first data frame, in response to detecting that the second data being enqueued in a transmission queue during the transmitting of the first data frame, wherein the first RU is different from the second RU,
wherein the second data frame is piggybacked onto an ongoing transmission of the first data frame such that the first data frame and the second data frame are included in a physical layer protocol data unit (PPDU),
wherein a start time of the second time resource is different from a start time of the first time resource, and
wherein the first data is non-real time data and the second data is real time data.

12. The method of claim 11, wherein the transmitting of the second data frame further comprises starting transmission of the second data frame at a first time different from a second time of starting transmission of the first data frame, without performing backoff.

13. The method of claim 11, wherein the second data is associated with a real-time application.

14. The method of claim 13, wherein the second RU is reserved for transmission of the data associated with the real-time application.

15. The method of claim 11, wherein the second RU is a random access resource unit.

16. The method of claim 14, wherein information indicating that the second RU is reserved for transmission of the data associated with the real-time application is included in a trigger frame transmitted by an access point.

17. The method of claim 11, wherein the transmitting of the second data frame comprises transmitting a physical layer (PHY) preamble and a PHY header that are included in the second data frame when the second data is enqueued in the transmission queue.

18. The method of claim 11, wherein whether to support an operation of immediately transmitting the second data frame during the transmission of the first data frame is determined based on capability-related information.

19. The method of claim 18, wherein the capability-related information is included in an association request frame or an association response frame.

20. The method of claim 18, wherein the capability-related information is shared in an association operation between the electronic device and an external device.

* * * * *